United States Patent [19]

Vincent

[11] Patent Number: 5,065,801
[45] Date of Patent: Nov. 19, 1991

[54] LATHE ATTACHMENT DUPLICATING DEVICE

[76] Inventor: Alex Vincent, 1112 Sacramento Drive, S.W., Calgary, Alberta, Canada, T2W 0J2

[21] Appl. No.: 590,771

[22] Filed: Oct. 1, 1990

[51] Int. Cl.⁵ .............................................. B23B 8/28
[52] U.S. Cl. ......................................... 142/38; 142/1; 142/21; 142/43; 144/137
[58] Field of Search .................. 142/1, 7, 21, 38, 39, 142/43, 46, 52; 144/137, 142, 144 R; 409/125, 130

[56] References Cited

U.S. PATENT DOCUMENTS 3,276,489  10/1966  Little .............................. 144/144 R
3,332,458   7/1967  Baldwin ......................... 144/144 R

*Primary Examiner*—W. Donald Bray
*Attorney, Agent, or Firm*—George A. Seaby

[57] ABSTRACT

A duplicating device for use on a wood lathe includes a baseplate for mounting behind a lathe on a table carrying the lathe, a mirror pivot ally mounted on the baseplate, and a template carrier on the baseplate between the mirror and the lathe. A template, e.g. a finished spindle is mounted on the carrier, and a blank is mounted in the lathe. By visually aligning the blank and template on a line perpendicular to the mirror, the blank can be turned to reproduce the template design accurately.

8 Claims, 4 Drawing Sheets

LATHE ATTACHMENT DUPLICATING DEVICE

BACKGROUND OF THE INVENTION

1. Field of the Invention

This invention relates to a duplicating device for use on a lathe.

2. Discussion of the Prior Art

While the device of the present invention was specifically designed for reproducing wooden spindles or the like, it will be appreciated that the device can be used to reproduce other wooden and even metal products on a lathe.

At present, the only types of duplicators for use with lathes are expensive computer guided or mechanically guided duplicators. The inventor is aware of no commercially available devices for duplicating a previous turned article such as a spindle or the like which provide accurate visual guidance, or any guidance allowing the operator's skills and existing turning chisels to be used to the fullest. Existing mechanically guided duplicators at the bottom end of the price scale generally will not produce a furniture quality spindle by themselves and therefore require final touch-up using conventional chisels and/or extensive sanding.

The object of the present invention is to provide a solution to the above identified problem in the form of a relatively simple duplicating device, which is easy to install and use on a lathe.

GENERAL DESCRIPTION OF THE INVENTION

Accordingly, the present invention relates to a duplicating device for use on a lathe comprising frame means for mounting behind the centerline defined by a live center and a tailstock center of a lathe; mirror means on said frame means extending parallel to the centerline of the lathe in the use position; and template carrier means on said frame means between said mirror means and the centerline in the use position.

BRIEF DESCRIPTION OF THE DRAWINGS

The invention will be described in greater detail with reference to the accompanying drawings, which illustrate a preferred embodiment of the invention, and wherein.

DESCRIPTION OF PREFERRED EMBODIMENT

Figure 1:
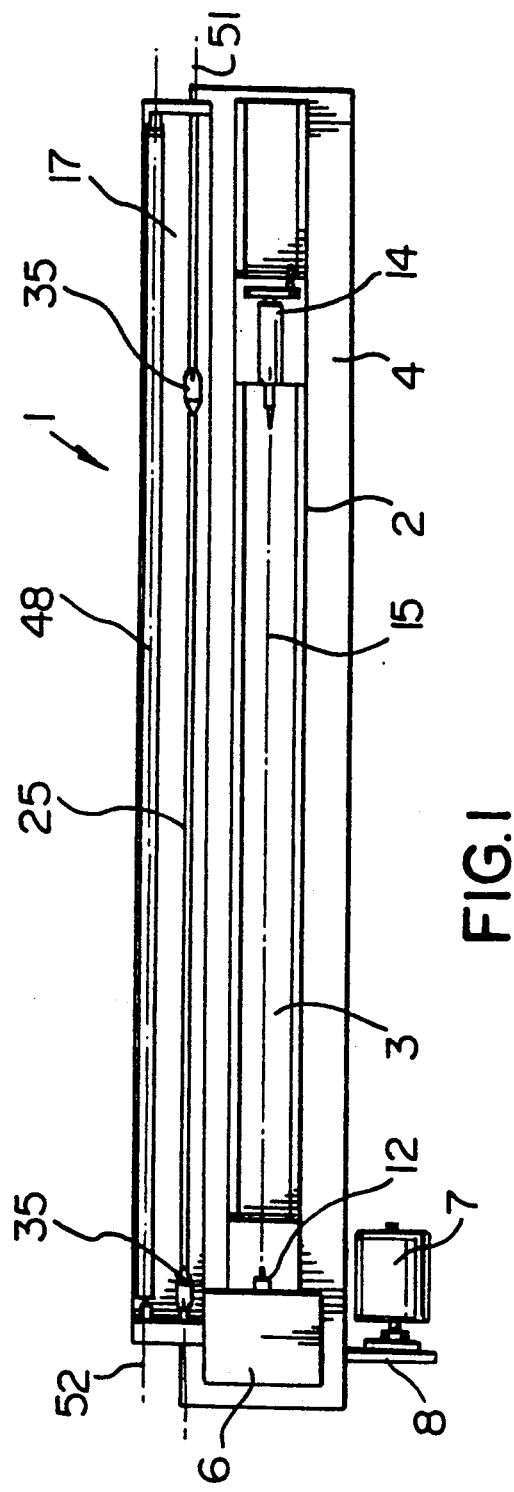
FIG. 1 is a schematic, plan view of a lathe and a duplicating device in accordance with the present invention.
Figure 2:
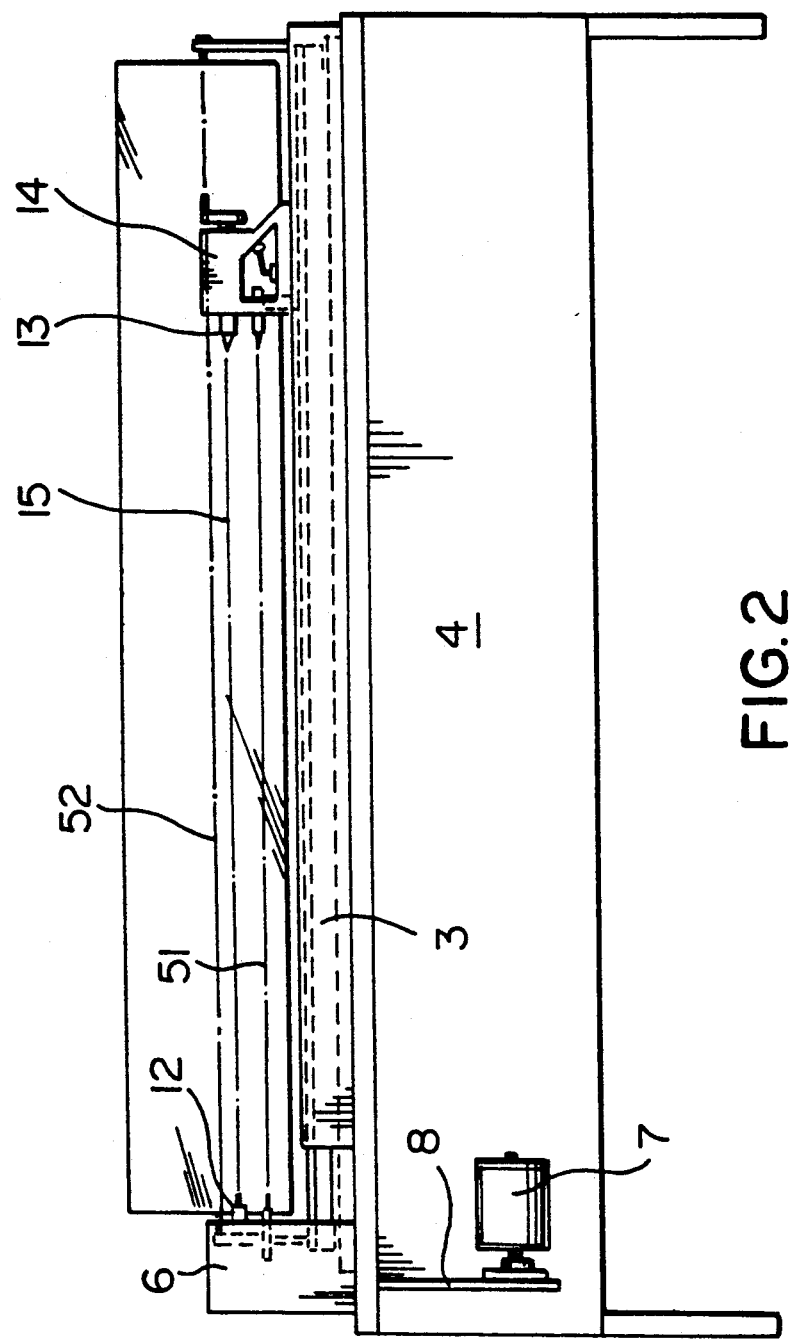
FIG. 2 is a schematic, front view of the lathe and duplicating device of FIG. 1.
Figure 3:
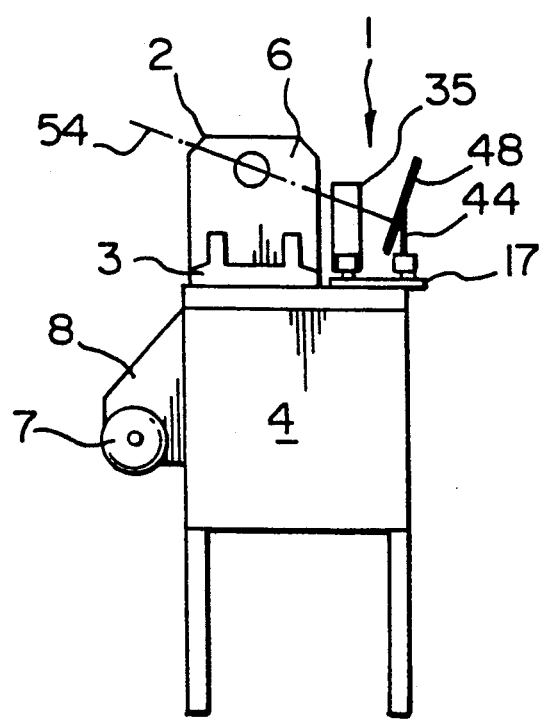
FIG. 3 is an end view of the lathe and duplicating device of FIGS. 1 and 2.

With reference to FIGS. 1 to 3, the duplicating device of the present invention which is generally indicated at 1 is intended for use with a lathe 2 of the type including a base 3 mounted on a table 4 or other support. A fixed head 6 containing a transmission (not shown) is provided at one end of the base 3. The transmission is connected to a motor 7 mounted on a bracket 8 on one side of the table 4 by a belt (not shown). A chuck or mandrel 12 extends out of the head 6 for supporting one end of a workpiece (not shown). The other end of the workpiece is supported by a mandrel 13 extending towards the mandrel 12 from a tailstock 14.

The tailstock 14 is movable towards and away from the mandrel 12 for accommodating workpieces of various lengths. A line 15 between the mandrels 12 and 13 defines the centerline of the lathe.

Figure 4:
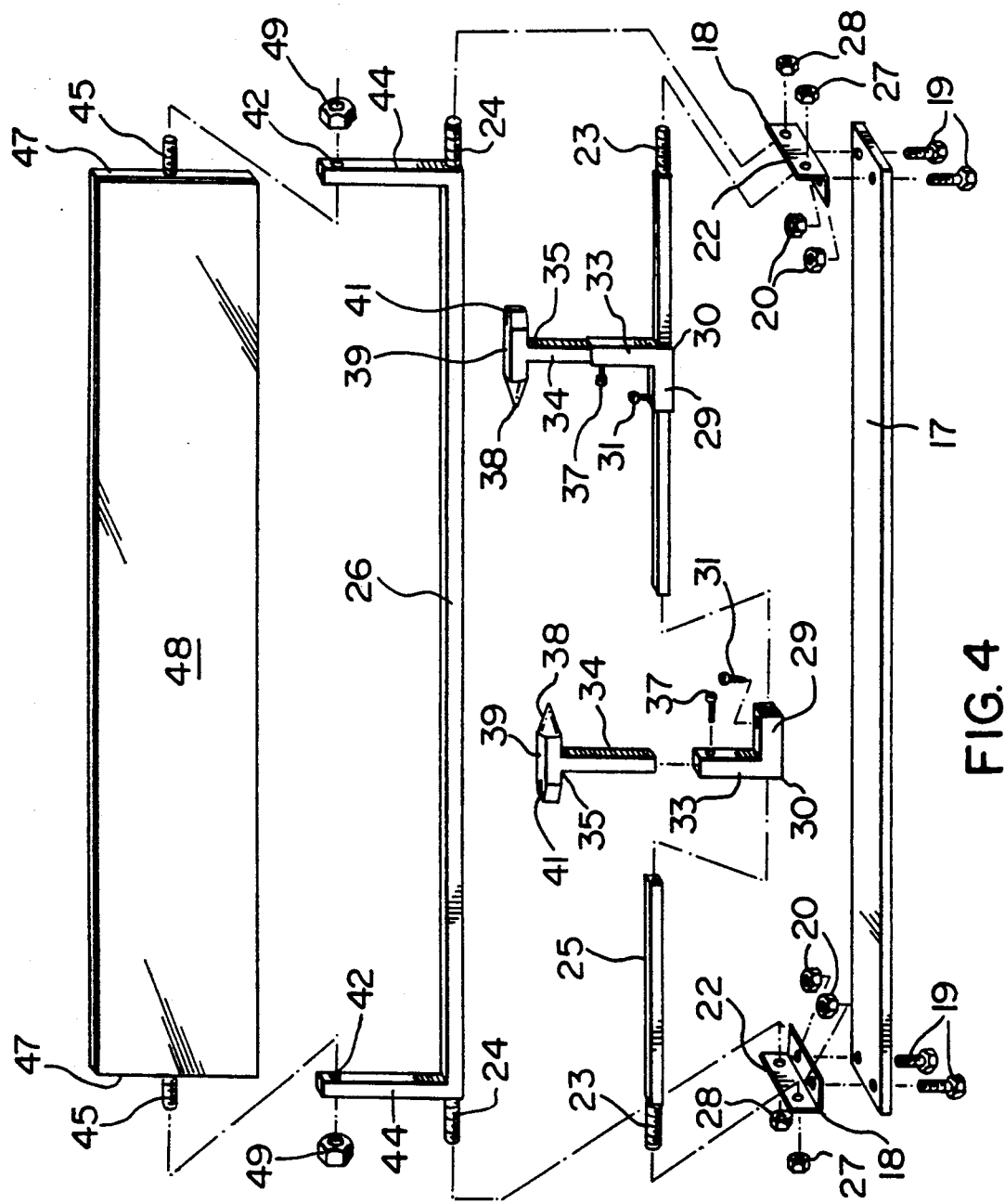
FIG. 4 is an exploded, isometric view of the device of FIGS. 1 to 3 on a larger scale.

The duplicating device 1 of the present invention includes a frame defined by a baseplate 17 (FIGS. 1, 3 and 4 for mounting on the table 4 behind the lathe 2. A pair of brackets 18 of L-shaped cross section are mounted on the ends of the baseplate 17 by means of bolts 19 and nuts 20. The vertical arms 22 of the brackets 18 support the threaded ends 23 and 24 of a rectangular cross section rod 25 and an elongated, generally U-shaped bracket 26 respectively. Nuts 27 and 28 are provided on the ends 23 of the rod 25 and on the ends 24 of the bracket 26, respectively. The bottom, horizontal arms 29 of a pair of tubular, L-shaped brackets 30 are mounted on the rod 25. The brackets 30 are fixed in one location by screws 31, the vertical arm 33 of each bracket 30 receives the stem 34 of a generally T-shaped template holder 35. The holder 35 is secured in the bracket 30 by means of screws 37. By loosening the screws 37, the vertical positions of the holders 35 in the brackets 30 can be adjusted. One end 38 of the top arm 39 of each holder 35 is pointed for engaging the center of the ends of a template (not shown). A vertical slot 41 is provided in the other end of each top arm 39 of each holder 35 for holding a flat template, i.e. a flat cutout of the article to be reproduced.

A hole 42 is provided in the top end of each vertical arm 44 of the bracket 26 for receiving a threaded shaft 45 extending outwardly from an end 47 of a mirror 48. The mirror 48 is secured in position by nuts 49. Thus, the angle of inclination of the mirror 48 can readily be adjusted. It will be appreciated that the nut and bolt combinations referred to hereinbefore could readily be replaced by quick release devices similar to the type commonly used to hold wheels on bicycles. The baseplate 17 is installed on the table 4 behind the lathe 2, and parallel to the centerline 15 when viewed from above or in front. A finished spindle or template is mounted between the holders 35, and a workpiece is mounted in the lathe 2. When the template is a finished spindle or other product, the pointed ends 38 of the holders 35 are used to position the template on the rod 25. When the template is in sheet form, i.e. cardboard, thin plywood or sheet metal, the slotted ends 41 of the holder 35 are used. The holders 35 are adjusted vertically to ensure that they are accurately aligned. Of course, the brackets 30 are moved horizontally to the proper spacing while mounting the template in the holders 35.

The duplicating device operates on a simple principle, namely that an object such as a spindle or template placed in front of and parallel to a mirror will produce an exact image of itself. If any point on the template is aligned optically with the same point on the reflected image and extrapolated forwardly to the workpiece, it is a simple matter to cut the workpiece using conventional chisels or other cutting implements to correspond to the template. In order for the device to be used in this manner, a line 51 through the longitudinal center of the horizontal arm 39 of the holder 35 must be parallel to the centerline 15 of the lathe. Both such lines 15 and 51 must be parallel to a line 52, which represents the longitudinal axis of the mirror 48 and of the shafts 45. Moreover, a line 54 (FIG. 3) drawn through the lines 15 and 51 intersecting the plane of the mirror 48 must be perpendicular to such plane.

With the workpiece or blank (a piece of wood) installed in the lathe between the centers thereof, the nuts 27 are loosened and the rod 25 is rotated so that the holders 25 have the desired inclination. Such inclination is chosen so that while the template is as close as possible to the workpiece, the latter is free to rotate on the lathe. The nuts 27 are tightened, and the nuts 31 are loosened to move the template holders 35 to the proper position, preferably with the lefthand end of the workpiece and the template aligned. The nuts 37 are used when adjusting the height of the holders 35 to a convenient height.

Of course, the proper ends of the holder 35 should oppose each other for holding a finished product template or a flat template. The height of the holders 35 should be such that an extension of the line 54 away from the mirror should intersect a point close to the operator's eye. This eliminates the necessity for continuous vertical head movement on the part of the operator for checking accuracy. The template holders 35 are moved together to ensure that they are the same height and the template (not shown) is inserted into position.

A small carpenter's square (not shown) is rested on the template and, with the blade pointing upwardly, slide into position to touch the mirror 48. The mirror holding nuts 49 are loosened, and the mirror 48 is tilted until the full blade of the square contacts the mirror, which is then locked in position by tightening the nuts 49. This operation is employed when there is a square portion of the template having a diameter the same as that of the blank. If such is not the case, it is necessary to remove the blank and place the square across the centers of the lathe and the holders 35 in order to adjust the mirror angle. Alternatively, a small portion of the blank can be turned to the same diameter as the corresponding portion of the template. By placing a square across such portions, the mirror can be properly adjusted. Cutting of the blank can be effected using chisels or other cutting implements. Once the foregoing adjustments have been made, it is possible to cut any number of blanks without additional adjustments.

With everything in position, there are four images, two being real and the others being reflections. If a pencil line perpendicular to the mirror 48 is marked on the template, there will be two lines (the real line and the reflection). By closing one eye, aligning the lines and marking a similar line on the blank, four aligned marks will be produced. This demonstrates the possibility of establishing points in a vertical plane. The possibility of establishing points on a horizontal plane is proven using calipers to measure the diameter of the blank and template. A portion of the blank is turned using chisels or other cutting implements to the same diameter as the template. By closing one eye and moving the head vertically, the operator will reach a level where the top of all four images are aligned.

It will be appreciated that by tilting the mirror 48 away from the vertical, the device could conceivably be used to enlarge (mirror tipped back) or reduce (mirror tipped forward) the diameter of the article produced using a fixed size template while maintaining the same length proportions.

I claim:

1. A duplicating device for use on a lathe comprising frame means for mounting behind the centerline defined by a live center and a tailstock center of a lathe; mirror means on said frame means extending parallel to the centerline of the lathe in the use position; and template carrier means on said frame means between said mirror means and the centerline in the use position.

2. A device according to claim 1, wherein said frame means includes baseplate means for mounting on a lathe carrying support; and bracket means pivotally connecting said mirror means and said template carrier means to said baseplate means.

3. A device according to claim 2, wherein said bracket means includes a pair of first brackets pivotally connecting said mirror means and said template carrier means to said baseplate means.

4. A device according to claim 3, including a bracket movable on said template carrier means for adjusting the carrier means to different templates and permitting the changing of the position of a template on the apparatus.

5. A device according to claim 4, wherein said template carrier means includes an elongated rod pivotally mounted in said first brackets, and said second bracket includes a pair of L-shaped tubes, the base of each tube being slidably mounted on said rod.

6. A device according to claim 5, wherein said template carrier means includes a T-shaped template holder slidably mounted in the vertical arm of each said L-shaped tube.

7. A device according to claim 6, wherein said holder includes a top arm, one end of which is pointed for holding an elongated, three-dimensional template, and the other end of which is slotted for holding a flat template.

8. A device according to claim 3, wherein each said first bracket is generally U-shaped, including a pair of vertical arms for pivotally supporting said mirror means.

* * * * *